United States Patent [19]
Bailey, Jr.

[11] Patent Number: 5,833,348
[45] Date of Patent: Nov. 10, 1998

[54] APPARATUS FOR ILLUMINATING WHEELED DEVICES

[75] Inventor: Robert Bailey, Jr., Staten Island, N.Y.

[73] Assignee: Fricke & Solomon, Newark, N.J.

[21] Appl. No.: 803,604

[22] Filed: Feb. 21, 1997

Related U.S. Application Data

[60] Division of Ser. No. 493,819, Jun. 22, 1995, Pat. No. 5,634,707, which is a continuation-in-part of Ser. No. 245,411, May 18, 1994, abandoned.

[51] Int. Cl.⁶ .................. A63C 17/26; B62J 6/00
[52] U.S. Cl. .................. 362/72; 362/103; 362/800; 362/61; 280/11.22
[58] Field of Search .................. 362/78, 72, 35, 362/192, 235, 249, 800, 287, 806, 103, 252, 193, 253; 280/11.22, 11.23, 81.1, 11.19, 809, 816; 36/137; 340/432

[56] References Cited

U.S. PATENT DOCUMENTS

| | | | |
|---|---|---|---|
| 2,083,514 | 6/1937 | Brown | 362/78 |
| 2,732,541 | 1/1956 | MacMahon | 362/72 |
| 4,782,431 | 11/1988 | Park | 362/78 |
| 5,128,840 | 7/1992 | Seki et al. | 362/78 |

*Primary Examiner*—Thomas M. Sember
*Attorney, Agent, or Firm*—Jay H. Maioli

[57] ABSTRACT

An apparatus for illuminating a bicycle pedal connected to a rotating object includes a stepper motor having a shaft and a stator mounted on the bicycle pedal. A mechanical coupling is provided for connecting the shaft to the rotating object for rotating the shaft of the stepper motor as the rotating object rotates. A plurality of light emitting diodes is mounted on a surface of the bicycle pedal and is electrically connected to the stepper motor. Alternatively, a boot portion of a roller skate is connected to a rotating wheel for illuminating the boot portion.

12 Claims, 6 Drawing Sheets

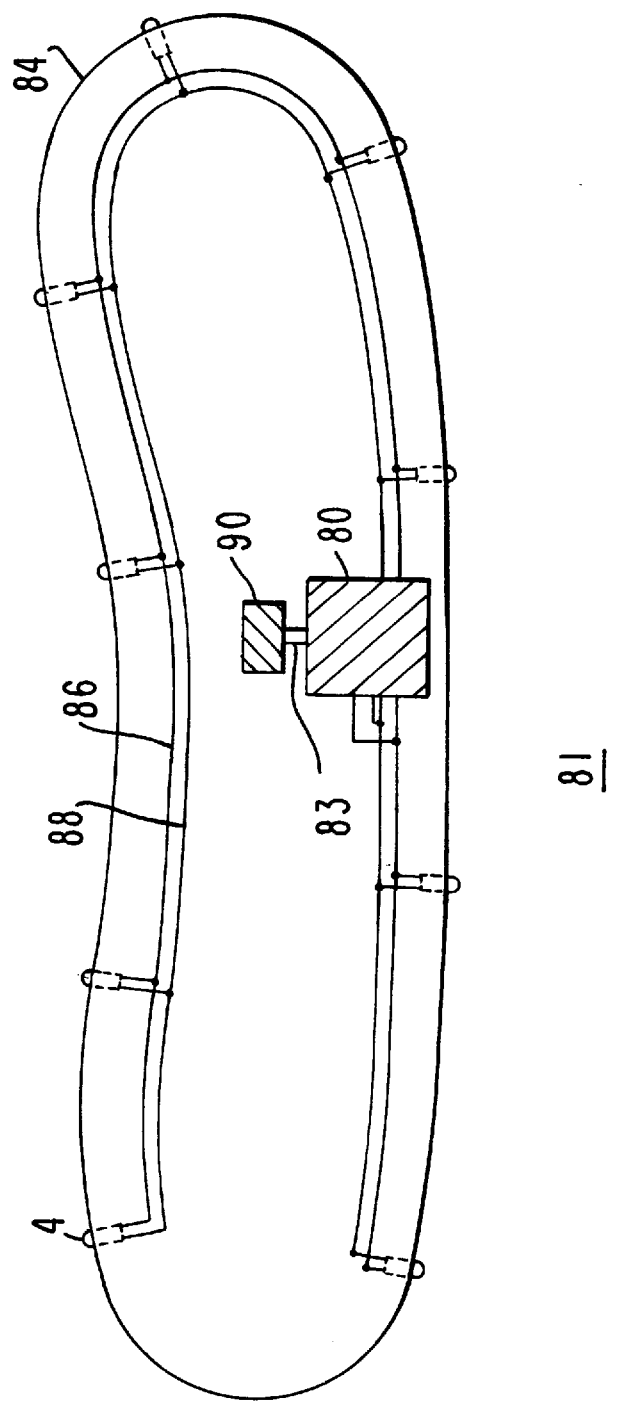

5,833,348

APPARATUS FOR ILLUMINATING WHEELED DEVICES

This is a division of application Ser. No. 08/493,819 filed Jun. 22, 1995, now U.S. Pat. No. 5,634,707 which is a continuation in part of application Ser. No. 08/245,411 filed May 18, 1994, now abandoned.

BACKGROUND OF THE INVENTION

1. Field of the Invention

The present invention relates generally to the field of illuminating rotating objects and, more specifically, to a device for illuminating the surfaces of wheeled vehicles with light emitting diodes.

2. Description of the Background

Devices for lighting the wheels of a vehicle have become increasingly popular. Such devices add to the aesthetic appeal of the vehicle and improve safety by making the vehicle more visible at night. Vehicle owners wanting to add such features to their wheels desire a product that is both easy to use and inexpensive.

Various devices have been proposed in the past for illuminating the wheels of vehicles. However, in some devices the lights do not rotate with the wheel. In other cases a brush mounted on a non-rotating portion of the vehicle is used to transmit power to the wheel. Such devices, however, wear out easily or can be fouled by grease and dirt common on the undercarriage of automobiles. Further, the use of a brush creates an undesirable noise as the brush contacts rub against the contacting surface of the wheel. This noise detracts from the aesthetic appeal the device. Also, devices that transmit power from the vehicle chassis to a rotating wheel must be connected to the vehicle's electrical system by wires and perhaps a switch. This makes installation inconvenient.

OBJECTS AND SUMMARY OF THE INVENTION

In order to solve the above-described problems, an object of the present invention is to provide an improved device for illuminating a rotating wheel that is easy to use and inexpensive.

Further, another object of the present invention is to protect the lights for illuminating the wheel by arranging them in a plastic tubing filled with a buffer material.

Still another object of the present invention is to provide an improved means for providing electrical power to the lights that is free of brush noise and is reliable.

According to a first aspect of the present invention, there is provided an electrical generating source housed in a wheel cover of a rotating wheel that provides power to light emitting diodes contained in a plastic tube mounted around the rim of the wheel for rotation therewith. The electrical generating source is a stepper motor with an eccentric weight mounted on its shaft.

According to a second aspect of the present invention there is provided a stepper motor housed in the foot pedal of a bicycle. The shaft of the stepper motor is rotationally connected to the shank of the bicycle. The motor provides electrical power to light emitting diodes mounted along the edges of the pedal.

According to a third aspect of the present invention there is provided a stepper motor mounted below the sole of a roller skate. The shaft of the motor is rotationally connected to a wheel of the roller skate. The motor provides electrical power to light emitting diodes mounted along the edge of the sole of the roller skate.

BRIEF DESCRIPTION OF THE DRAWINGS

The above and other objects, features, and advantages of the present invention will become apparent from the following detailed description of illustrative embodiments thereof to be read in conjunction with the accompanying drawings, in which:

FIG. 7 is a sectional view of the embodiment of FIG. 6 taken along section lines 7—7.

DETAILED DESCRIPTION OF PREFERRED EMBODIMENTS

Figure 1:
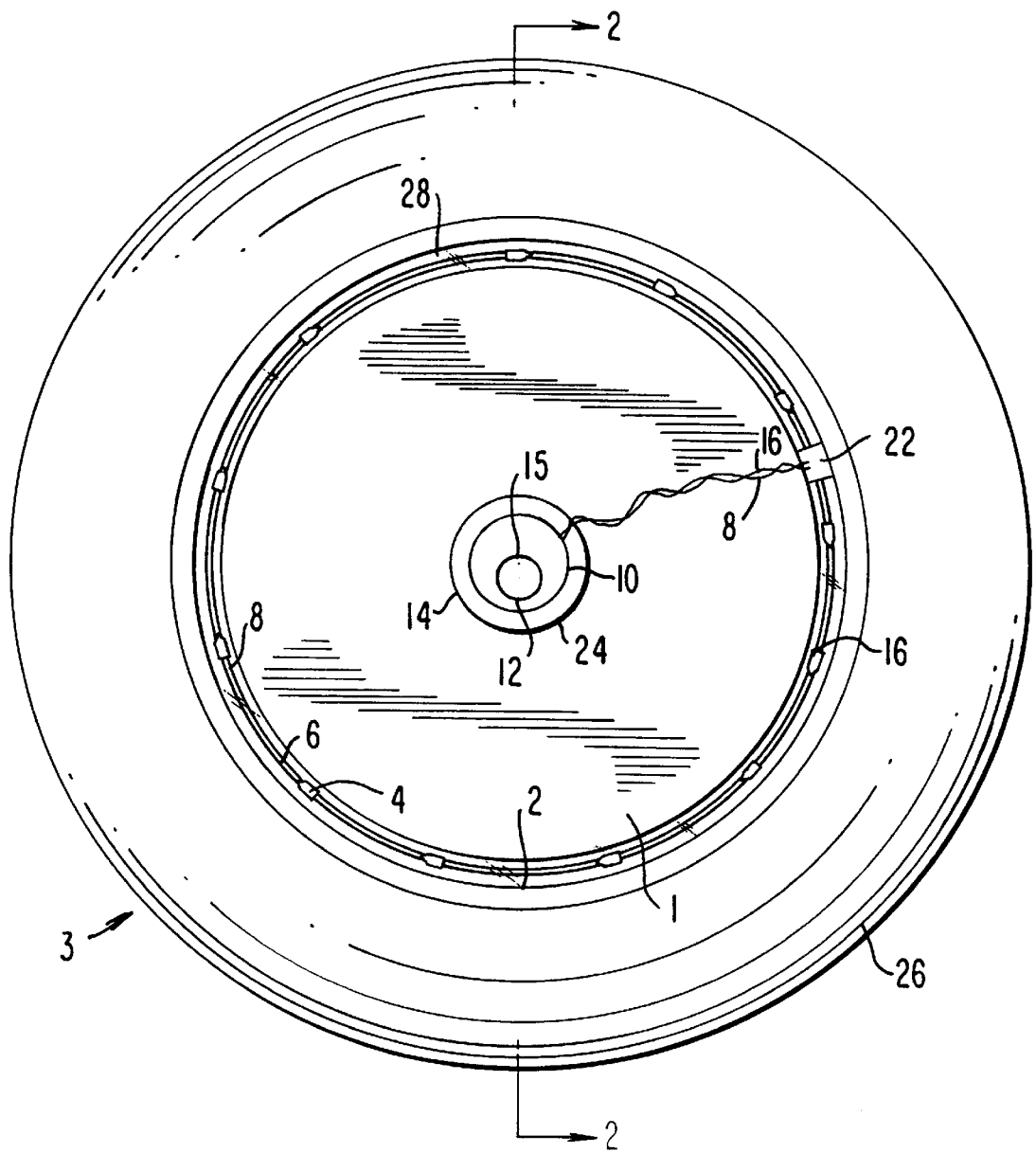
FIG. 1 is a view of an automobile wheel according to a first embodiment of the present invention.
Figure 2:
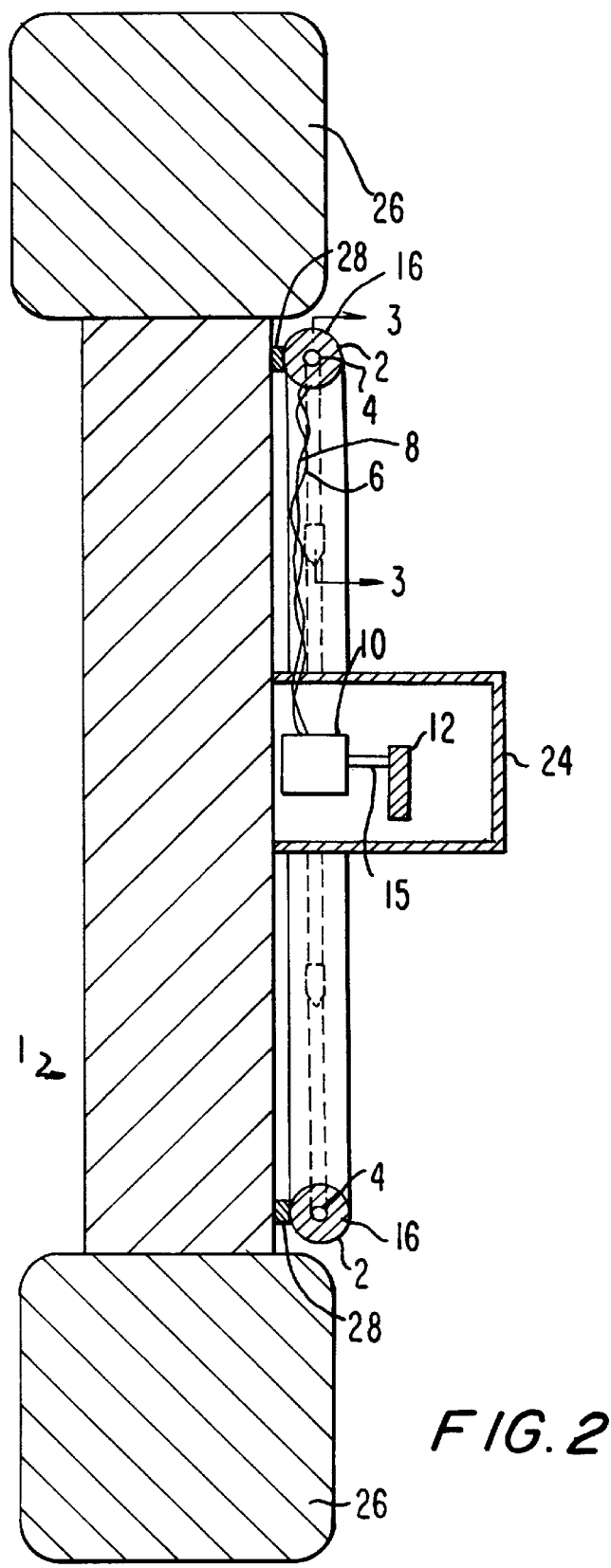
FIG. 2 is a sectional view of the embodiment of FIG. 1 taken along section lines 2—2.

FIG. 1 is a view of a first embodiment of the present invention, showing the front of an automobile wheel 3, including the tire 26 and the tire rim 1. At or near the center of a tire rim 1, a stepper motor 10 is mounted. The stepper motor 10 has a shaft 15 with counterweight 12 attached thereto so that when the wheel 3 and the tire rim 1 rotate, the stepper motor 10 turns relative to the non-rotating shaft 15 which is attached to the non-rotating counterweight 12. As the stepper motor 10 turns, it generates electrical pulses that are carried by wires 6, 8 to a plurality of light emitting diodes (LED's) 4, which are connected in parallel and mounted along the edge of the tire rim 1. Pulses of current generated by the rotating stepper motor 10 alternate in polarity and periodically exceed the threshold voltage of the LED's 4, thereby illuminating them. The stepper motor 10 and counterweight 12 are protected by a cap 24 as shown in FIG. 2.

The stepper motor 10 is a three phase, 1.8 volt motor that provides 0.200 milliamps of current to power the LED's 4. The stepper motor 10 is the type of motor that is used, for example, in the print head of dot matrix printers. The stepper motor 10 has a winding resistance of 120Ω. Although the stepper motor 10 is a three phase motor having six poles per phase, it is run as a single phase motor having six poles. Additionally, for a stepper motor 10 that steps at 7.50 of rotation relative to the shaft 15, 11Ω of resistance is provided. Alternatively, the stepper motor 10 may step at 6° or at 1.8°. For the first embodiment, the output voltage of the stepper motor 10 is up to 5 volts AC (alternating current).

Figure 3:
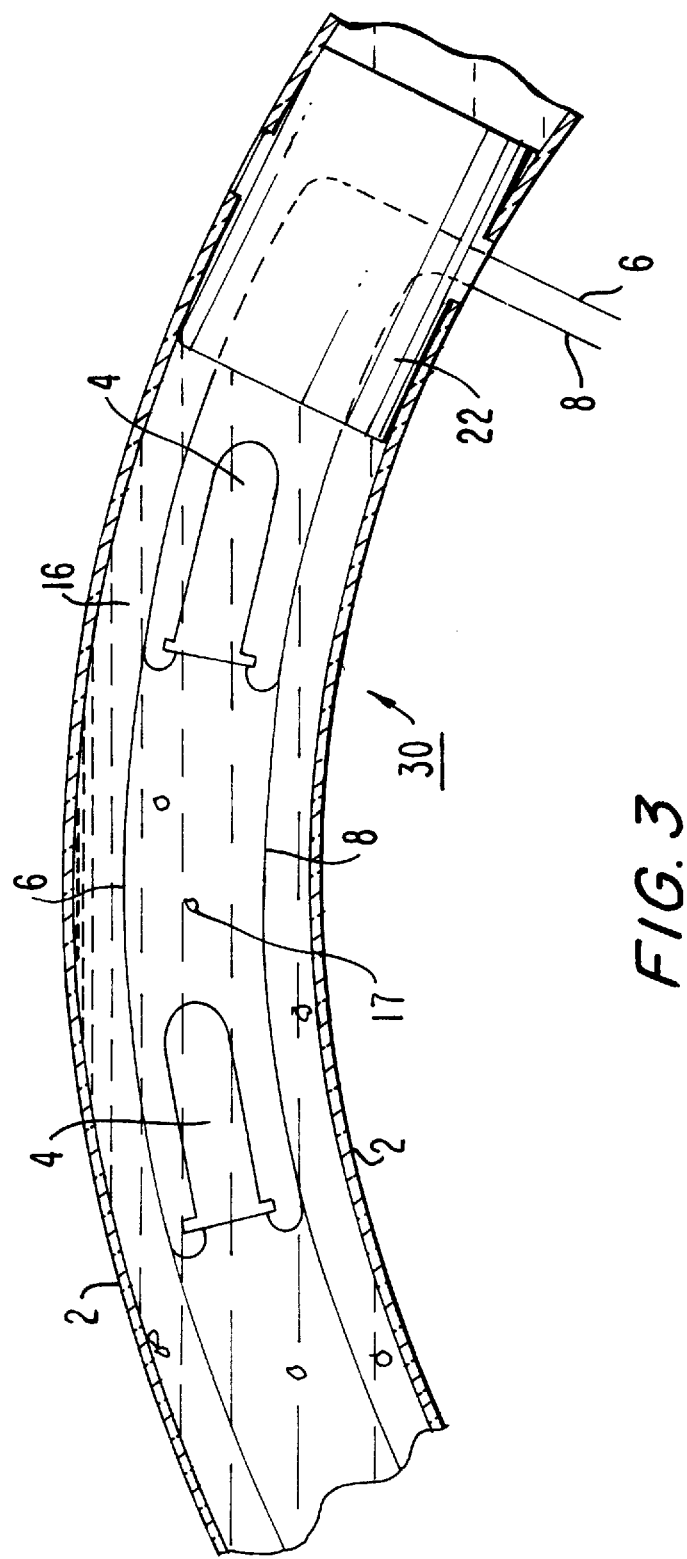
FIG. 3 is a detailed sectional view of a portion of the embodiment of FIG. 2 taken along section lines 3—3.

FIG. 3 shows a detailed view of a tube assembly 30, in which the plurality of LED's 4 are placed inside a protective transparent tube 2 that is filled with a viscous liquid 16 such as glycerine. A molded plastic plug 22 is fitted in both ends of the tube 2 to keep the liquid 16 contained therein and to hold the tube assembly 30 in a circular loop. Wires 6, 8 extend from the stepper motor 10 through the side of the plug 22 and into the tube 2 to connect to the LED's 4. The tube 2 is mounted on the tire rim 1 with a suitable adhesive 28 such as room-temperature vulcanizing (RTV) rubber cement.

The tube 2 and the liquid 16 serve to protect the LED's 4 from damage due to vibration, shock and impact as the automobile wheel 3 rolls along the road. The liquid 16 may be clear, or it may be dyed with a coloring agent or mixed with reflective spangles 17 to enhance the visual impact of the device.

Figure 4:
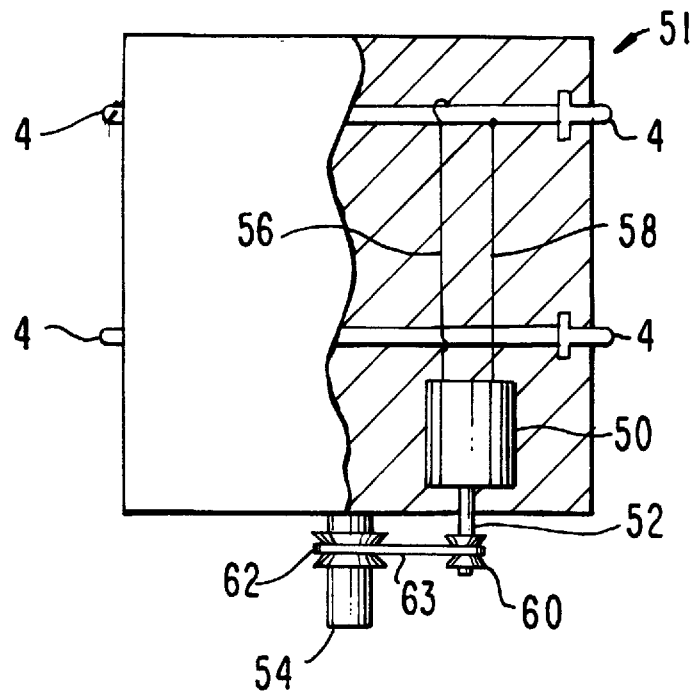
FIG. 4 is a partial sectional view of a bicycle pedal according to a second embodiment of the present invention.
Figure 5:
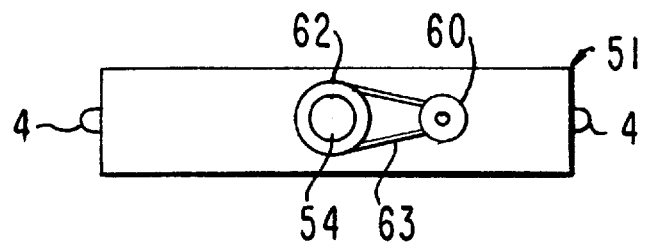
FIG. 5 is a side view of the embodiment of FIG. 4.

FIG. 4 is a partial sectional view of a second embodiment of the present invention, showing a bicycle pedal 51. A stepper motor 50 is mounted inside the bicycle pedal 51 and has a shaft 52 that projects from an outer surface of the pedal 51. A first pulley 60 is attached to the projecting shaft 52. A second pulley 62 encircles the shank 54 of the pedal 51. A belt 63 connects the stepper motor pulley 60 with the shank pulley 62 as shown in FIG. 5, so that when the pedal 51 rotates with respect to the shank 54, the belt 63 causes the stepper motor pulley 60 to rotate with respect to the stepper motor 50. Alternatively, the rotational connection between the stepper motor 50 and the shank 54 could be accomplished using interlocking gears or a compliant wheel on the stepper motor shaft in frictional contact with the shank 54.

Wires 56, 58, as shown in FIG. 4, carry pulses of current generated by the stepper motor 50 to LED's 4. that are electrically connected in parallel and mounted along opposite edges of the pedal 51. The voltage generated by the stepper motor 50 periodically exceeds the threshold voltage of the LED's 4 and illuminates them. The relative diameters of the shank 54 and the pulley 60, as well as the angular resolution of the stepper motor 50 determine the frequency of electrical pulses generated by the stepper motor 50. The pulse frequency can be selected so that the LED's 4 will either blink or appear continuously illuminated. For the second embodiment, the output voltage of the stepper motor 10 is 1 volt AC.

Figure 6:
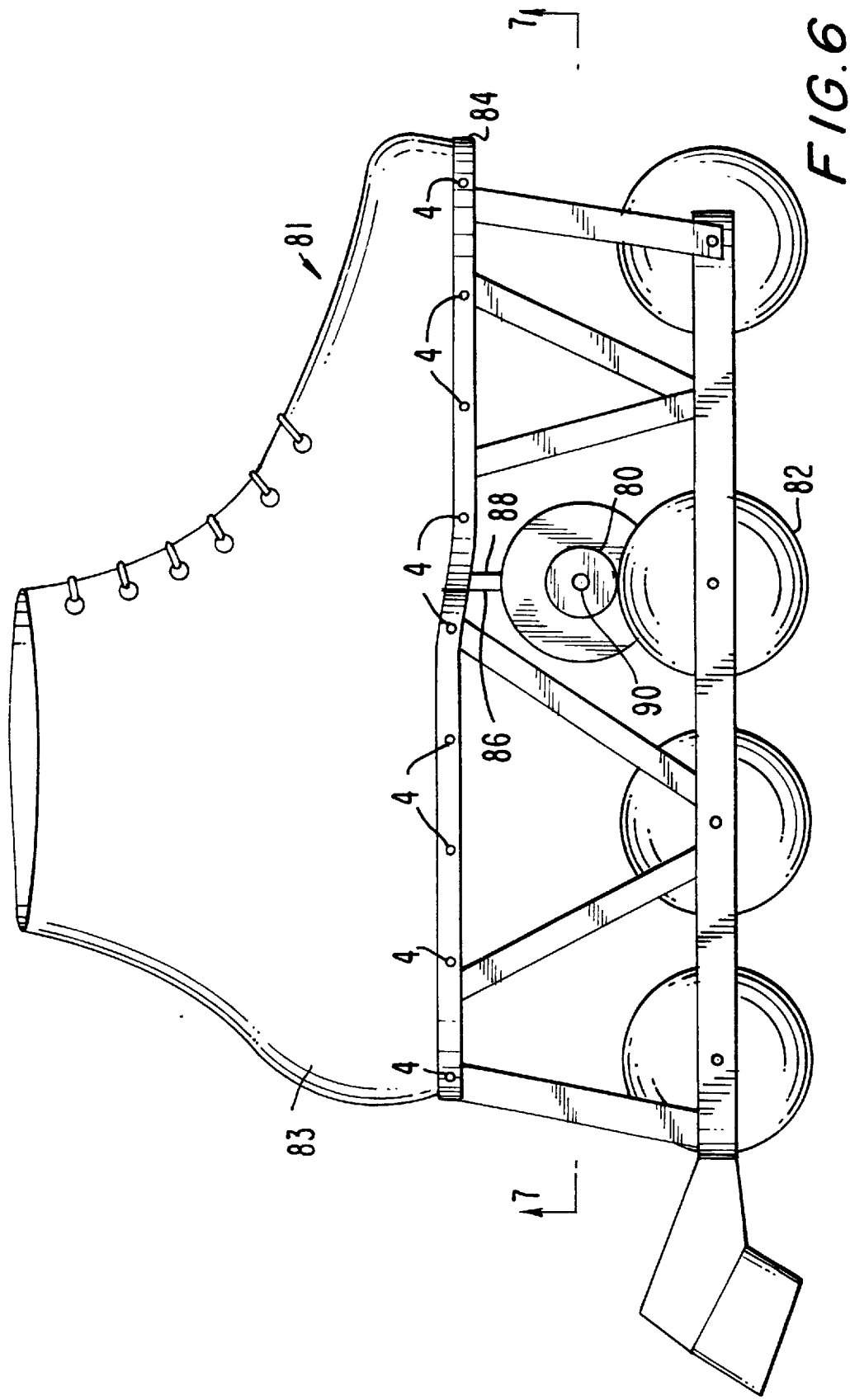
FIG. 6 is a side view of a roller skate according to a third embodiment of the present invention.

FIG. 6 shows a third embodiment of the present invention, in which a stepper motor 80 is mounted on an underside of the sole 84 of the boot portion 83 of an in-line roller skate 81. A urethane wheel 90 is mounted on the shaft 83 of the stepper motor 80. The urethane wheel 90 is pressed against a wheel 82 of the skate 81 for frictional contact therewith. When the skate wheel 82 turns, the urethane wheel 90 rotates turning the shaft 83 of the stepper motor 80. The stepper motor 80 generates electrical pulses that are carried by wires 86, 88 to LED's 4 mounted along the edge of the sole 84 of the skate 81.

FIG. 7 shows the underside of the sole 84. Wires 86, 88 connect each of the LED's 4 in parallel to the stepper motor 80. The voltage produced by the stepper motor 80 periodically exceeds the threshold voltage of the LED's 4 and illuminates them. As in the previous embodiment, the size of the urethane wheel 90 relative to the skate wheel 82 as well as the angular resolution of the stepper motor 80 may be selected so that the LED's 4 blink or appear continuously illuminated.

Having described specific preferred embodiments of the present invention with reference to the accompanying drawings, it is to be understood that the invention is not limited to those precise embodiments, and that various changes and modifications may be effected therein by one skilled in the art without departing from the spirit or the scope of the present invention as defined in the appended claims.

What is claimed is:

1. An apparatus for illuminating a non-rotating object connected to a rotating object comprising:

a stepper motor including a shaft and a stator mounted on the non-rotating object;

mechanical coupling means for connecting the shaft to the rotating object for rotating the shaft of the stepper motor as the rotating object rotates; and a plurality of light emitting diodes mounted on a surface of the non-rotating object and electrically connected to the stepper motor.

2. The apparatus of claim 1 wherein the mechanical coupling means comprises a pulley mounted on the shaft of the stepper motor, a pulley mounted on the rotating object, and a belt extending therebetween.

3. The apparatus of claim 1 wherein the mechanical coupling means comprises a compliant wheel mounted on the shaft of the stepper motor for frictional contact with the rotating object.

4. The apparatus of claim 1 wherein the non-rotating object is a boot portion of a roller skate and the rotating object is a wheel of the roller skate.

5. The apparatus of claim 1 wherein the shaft of the stepper motor is parallel to an axis of rotation of the rotating object.

6. The apparatus of claim 1 wherein the stepper motor is a three phase, 1.8 volt motor that provides 0.200 milliamps of current to the plurality of light emitting diodes.

7. The apparatus of claim 6, wherein the stepper motor is run as a single phase motor having six poles.

8. The apparatus of claim 1 wherein the stepper motor has a winding resistance of 120Ω.

9. The apparatus of claim 1 wherein the stepper motor steps at 7.5°.

10. The apparatus of claim 1 wherein the stepper motor steps at 6°.

11. The apparatus of claim 1 wherein the stepper motor steps at 1.8°.

12. An apparatus for illuminating a bicycle pedal connected to a rotating object comprising:

a stepper motor including a shaft and a stator mounted on the bicycle pedal;

mechanical coupling means for connecting the shaft to the rotating object for rotating the shaft of the stepper motor as the rotating object rotates; and a plurality of light emitting diodes mounted on a surface of the bicycle pedal and electrically connected to the stepper motor.

* * * * *